(12) United States Patent
Van Oort et al.

(10) Patent No.: US 10,545,639 B1
(45) Date of Patent: Jan. 28, 2020

(54) RUN-TIME WIDGET CREATING SYSTEM, DEVICE, AND METHOD

(71) Applicants: Levi D. Van Oort, Clarence, IA (US); Nicholas A. Paxton, Cedar Rapids, IA (US); John J. Kassie, Cedar Rapids, IA (US); Jason A. Myren, Marion, IA (US)

(72) Inventors: Levi D. Van Oort, Clarence, IA (US); Nicholas A. Paxton, Cedar Rapids, IA (US); John J. Kassie, Cedar Rapids, IA (US); Jason A. Myren, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 291 days.

(21) Appl. No.: 14/499,649

(22) Filed: Sep. 29, 2014

(51) Int. Cl.
    *G06F 3/0484* (2013.01)
(52) U.S. Cl.
    CPC .................. *G06F 3/0484* (2013.01)
(58) Field of Classification Search
    CPC .................................................... G06F 3/0484
    See application file for complete search history.

(56) References Cited

U.S. PATENT DOCUMENTS

| | | | |
|---|---|---|---|
| 7,650,627 B1* | 1/2010 | Stancheva | G06F 12/1491 380/59 |
| 8,462,018 B1* | 6/2013 | Shepherd | G01C 23/00 340/945 |
| 8,725,318 B1 | 5/2014 | McCusker | |
| 8,788,125 B1* | 7/2014 | Lahr | G01C 23/005 701/14 |
| 8,788,126 B1 | 7/2014 | Bull et al. | |
| 2003/0158975 A1* | 8/2003 | Frank | G06F 8/34 719/331 |
| 2013/0038525 A1* | 2/2013 | Hakegard | G01C 23/00 345/156 |
| 2014/0137085 A1* | 5/2014 | Rayole | G06F 9/45508 717/139 |

OTHER PUBLICATIONS

"Cockpit Display System Interfaces to User Systems", Jul. 1, 2013, ARINC Specification 661-5, Aeronautical Radio, Inc., Annapolis, Maryland.

\* cited by examiner

*Primary Examiner* — Jennifer N To
*Assistant Examiner* — Ashley M Fortino
(74) *Attorney, Agent, or Firm* — Daniel M. Barbieri; Donna P. Suchy; Angel N. Gerdzhikov (57) ABSTRACT

A system, device, and method for creating widgets presentable in an image are disclosed. The widget creating system may include a system configuration file, one or more definition files, and a windows generator (WG). The WG may be configured to perform definition and run-time operations. The definition operation may include loading the system configuration file; loading first definition file(s) owned by a first user application and include at least one first-layer widget defined by a set of widget parameters, where each set may include contents corresponding to a second definition file of a second layer; and creating one or more first-layer widgets. The run-time operation may include loading one or more first-layer widget data parameter sets, where the contents corresponding to the second definition file are loaded and at least one second-layer widget is created during run time.

20 Claims, 7 Drawing Sheets

WidgetFactory Parameter Data

| Parameter | Change | Description |
|---|---|---|
| WidgetType | D | A661_WIDGET_FACTORY |
| WidgetIdent | D | Unique Identifier of Widget |
| ParentIdent | D | Identifier of the immediate container of the widget |
| Visible | DR | Visibility of widget |
| Enable | DR | Ability of the widget to be activated (interactivity) |
| WidgetDefintionData | R | A661_BUFFER_OF_DEFINITION_DATA |

D: Parameter set at definition time
DR: Parameter set at definition time and modifiable at run time
R: Parameter modifiable at run time

FIG. 2

A661_ParameterStructure_Definition

| A661_ParameterStructure | Size (bits) | Description |
|---|---|---|
| ParameterIdent | 16 | A661_BUFFER_OF_DEFINITION_DATA |
| { A661_Definition_File } | {32}+ | ARINC 661 definition data file stream |

FIG. 3

WindowContainer Parameter Data (Partial)

| Parameter | Change | Description |
|---|---|---|
| WidgetType | D | A661_WINDOW_CONTAINER |
| WidgetIdent | D | Unique Identifier of Widget |
| ParentIdent | D | Identifier of the immediate container of the widget |
| Visible | DR | Visibility of widget |
| Enable | DR | Ability of the widget's descendants to be interactive |
| ProcessingLimit | D | Defines max. time allowed to process widgets in this window. |
| MemoryLimit | D | Defines max. memory amount that can be used for storing all the widget/other data for this window. |

D: Parameter set at definition time
DR: Parameter set at definition time and modifiable at run time
R: Parameter modifiable at run time

RUN-TIME WIDGET CREATING SYSTEM, DEVICE, AND METHOD

BACKGROUND

This invention pertains generally to the field of aircraft display system which generate visual images that present information to the crew of an aircraft.

Aeronautical Radio, Incorporated (ARINC) has published ARINC Specification 661 entitled "Cockpit Display System Interfaces to User Systems" (ARINC 661), an industry standard which defines an architecture to facilitate a creation of interactive displays. ARINC 661 standardizes the fundamental building blocks of cockpit avionics displays by providing specification that separates graphics from logic, defines a runtime architecture, and defines a communication protocol. The contents of ARINC 661 are known to those skilled in the art.

The Cockpit Display System (CDS) may display widgets to the end user, where ARINC 661 specifies a standard set of widgets to develop a cockpit display; a widget may be considered as a displayable entity that is either interactive or non-interactive. At startup, the CDS loads and displays widgets listed in Definition Files (DFs or singularly, DF). Each DF includes one or more layers, which are hierarchical listings of widgets that are loaded along with their initial properties such as, but not limited to, visibility and enablement. A DF may be associated with a User Application (UA).

ARINC 661 architecture separates graphics from logic. A UA may be connected to one or more layers and owned by an aircraft system and programmed with the logic for providing updated data via widget parameters to the CDS and reacting to user interactions with a display unit. Examples of aircraft systems that could own one or more UAs include, but are not limited to, air conditioning, auto flight, communications, electrical power, equipment and furnishings, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

In addition, ARINC 661 recommends a bi-directional runtime communication protocol for the exchange of data and events. Also, ARINC 661 specifies how each widget interacts with end-users, the CDS, and the UAs.

Moreover, ARINC 661 specifies that all widgets should be created during a definition phase to enable deterministic allocation of memory so that memory size may be reserved during the definition phase for the allocation of widgets. ARINC 661 does not provide for the creation of widgets other than the definition phase.

SUMMARY

Embodiments of the inventive concepts disclosed herein are directed to novel and non-trivial system, device, and method for creating widgets during a run time phase.

In one aspect, embodiments of the inventive concepts disclosed herein are directed to a system for creating widgets during a run-time phase. The widget creating system may include a system configuration file, one or more DFs, and a windows generator (WG).

In a further aspect, embodiments of the inventive concepts disclosed herein are directed to a device for creating widgets during a run-time phase. The device could be the WG and may be configured (or programmed) to perform a method of creating widgets during a run-time operations. During the definition phase, the WG may load the system configuration file; load one or more first DFs owned by a first user application and include at least one first-layer widget defined by a set of first-layer widget parameters; and create one or more first-layer widgets. The set of first-layer widget parameters may include contents corresponding to a second DF of a second layer. During the run-time phase, the WG may load one or more first-layer widget data parameter sets, where the contents corresponding to the second DF are loaded and, in response to being loaded, at least one second-layer widget is created during run time.

In a further aspect, embodiments of the inventive concepts disclosed herein are directed to a method for creating widgets during run-time operations. When configured to carry out the method, the WG may perform the actions discussed in the preceding paragraph.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
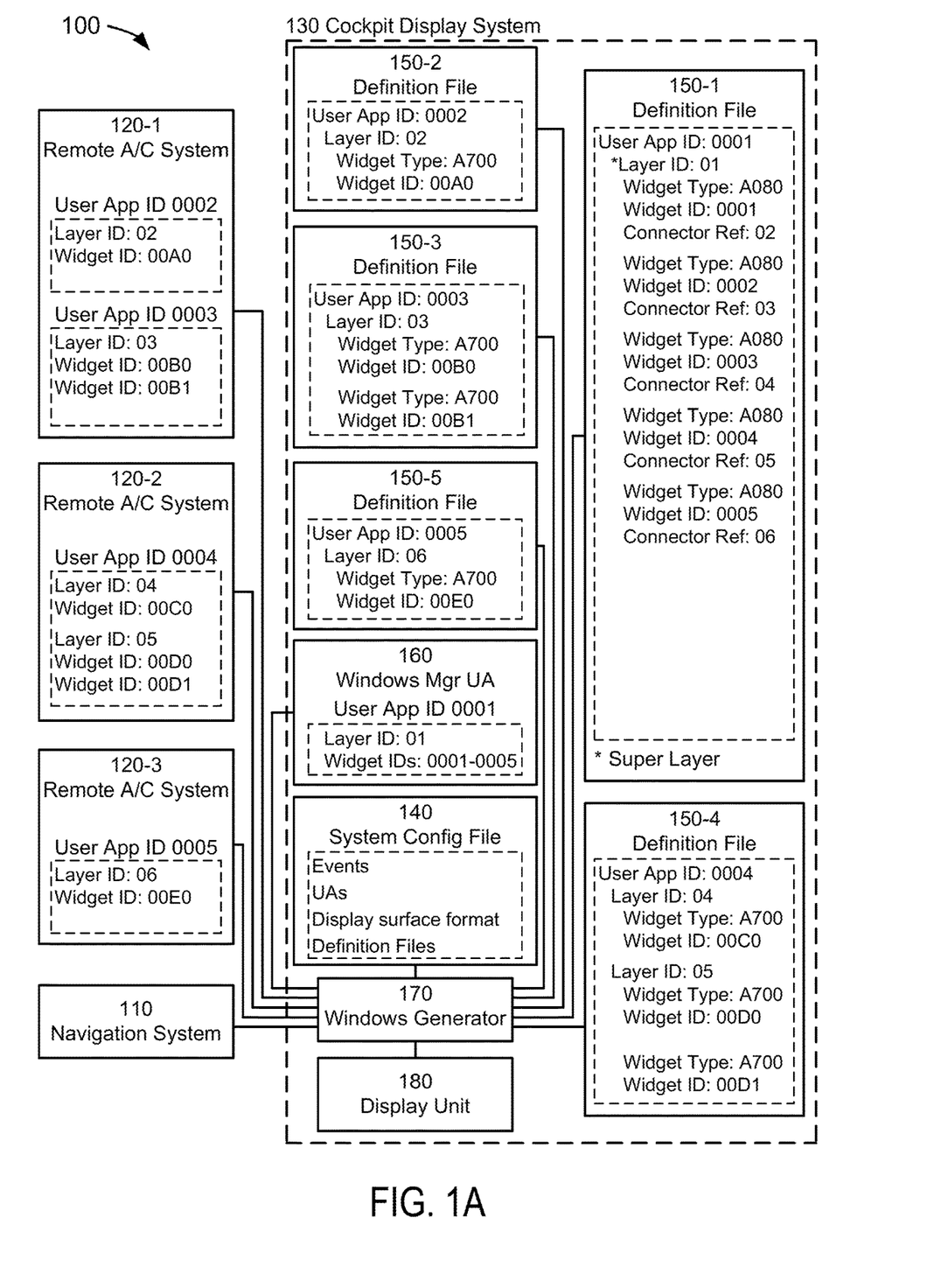
FIG. 1A depicts a block diagram of an ARINC 661 structure.

FIG. 1A depicts a block diagram of an ARINC 661 structure 100 within which a widget creating system suitable for implementation of the techniques described herein may be implemented. The ARINC 661 structure 100 of FIG. 1A may include a pilot input device 110, at least one remote aircraft system 120, and a cockpit display system (CDS) 130.

The pilot input device 110 may include any source for facilitating a pilot's interaction with an egocentric and/or exocentric view system. For example, the pilot input device 110 may be used by the pilot to manipulate the rho, theta, and/or phi measurements of a rho/theta/phi coordinate system, a coordinate system commonly applied in the generation of the exocentric view. In some embodiments, the pilot input device 110 may provide input representative of a pilot's selection to a windows generator (WG) 170. It should be noted that, although the discussion herein is drawn to the term "pilot," the definition of such term is not limited to flight personnel and includes ground personnel and/or any viewer of the display unit 180.

Remote aircraft systems 120 may include any system installed in an aircraft in which a user application (UA) has been installed. Types of remote aircraft systems include, but are not limited to, air conditioning, auto flight, communications, electrical power, equipment and furnishings, fire protection, flight controls, fuel, hydraulic power, ice and rain protection, instruments, landing gear, lights, a navigation system (including a flight management system (FMS), traffic collision and avoidance system (TCAS), automatic dependent surveillance-broadcast system (ADS-B), a forward-looking radar system, and terrain awareness and warning system (TAWS)), oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

As introduced in the preceding paragraph, the navigation system may include, but is not limited to, an air/data system, an attitude heading reference system, an inertial guidance system (or inertial reference system), a global navigation satellite system (or satellite navigation system), and the FMS which includes a navigation database configured to store waypoints, all of which are known to those skilled in the art. The navigation system could provide navigation data including, but not limited to, latitude, longitude, altitude, heading, pitch attitude, roll attitude, and yaw attitude; the navigation data could also include flight plan information which identifies or states invisible objects such as waypoints and visible objects such as airports as discussed below. As embodied herein, a navigation system could provide navigation data to the WG 170 for subsequent processing as discussed herein.

The UA of the remote aircraft systems 120, a system configuration file (CF) 140, a plurality of definition files (DFs, or singularly DF) 150, a windows manager UA (WMUA) 160, and the WG 170 may include software components stored in a digital memory storage device or generator-readable media (i.e., media readable by the WG 170) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Although the CF 140, the DFs 150, and the WMUA 160 are illustrated as being internal to the CDS 130, the storage devices storing any one of these may be external to the CDS 130 and used as an internal component of any other system of the aircraft.

Each remote aircraft system 120 could own one or more UAs and the layers included therein, where the layer may be considered as the highest level entity known by each UA. Referring to FIG. 1A, remote aircraft system 120-1 owns UAs 0002 and 0003 and layers 02 and 03, remote aircraft system 120-2 owns UA 0004 and layers 04 and 05, and remote aircraft system 120-3 owns UA 0005 and layer 06. In addition to each remote aircraft system 120, the CDS 130 owns WMUA 160 and layer 01.

The UAs of each remote aircraft system 120 may facilitate the dynamic exchange of blocks of data between the CDS 130 and the remote aircraft systems 120, where exchange protocols have been published by Aeronautical Radio, Incorporated (ARINC) in ARINC Specification 661 entitled "Cockpit Display System Interfaces to User Systems" (ARINC 661), an aviation industry standard which is hereby and herein incorporated by reference in its entirety. On the one hand, the UAs of the remote aircraft systems 120 may send real-time parameters measured and/or calculated by the remote aircraft systems 120 to the CDS 130 as updated runtime parameters of one or more widgets; also, UAs may request changes to one or more layer properties such as, but not limited to, layer visibility. Referring to FIG. 1A, real-time parameters of remote aircraft systems 120-1 through 120-3 may be sent as runtime parameters of their respective widgets; additionally, requests for runtime changes affecting properties of layers 02 through 06 may be sent.

On the other hand, the CDS 130 may send notices of real-time event occurrences (e.g., events initiated by interactions between a pilot and interactive widgets) to the UAs of the remote aircraft systems 120 as well as send notices of layer property changes such as, but not limited to, changes to layer activation. Referring to FIG. 1A, a notice of real-time event occurrence may be sent to UAs 0002 through 0005 for interactions with their respective interactive widgets; additionally, notices of runtime changes affecting the properties of layers 02 through 06 may be sent. The remote aircraft systems 120 may provide input to the WG 170 representative of widget parameters and layer properties; also, the remote aircraft systems 120 may receive output of the WG 170 representative of widget events and layer properties.

The CDS 130 may include many components including the system CF 140, the plurality of DFs 150, the WMUA 160, the WG 170, and/or the display unit 180. The system CF 140 may configure the initial settings for the CDS 130. The system CF 140 may include instructions for establishing a communication link(s) with one or more pilot input devices 110 for the subsequent receiving of input from a pilot's selection(s) through his or her interaction with widget(s), where such input may trigger the WG 170 to recognize event(s) associated with the pilot's selection(s). Also, the system CF 140 may include instructions or information related to the UAs and the layers owned by both the remote aircraft systems 120 and the WMUA 160, the configuration of a display surface format associated with the location of window(s) and the assignment of layer(s) to each window, and the loading and interpreting of the plurality of DFs 150. As embodied herein, the contents of the system CF 140 may be loaded and interpreted by the WG 170.

The DFs 150 could describe a hierarchical structure of widgets assigned to layers, where the widget could be considered as a building block. Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement Also, each widget could have a graphical look that represents how the object will appear when it is drawn on the display surface of the display unit 180. As stated above, an interactive widget could be a GUI which provides a means for the pilot to interact with the CDS 130.

A widget could be grouped into one or more categories such as, but not limited to, the following: a container or logical widget (e.g., basic container, mutually exclusive container, radio box), a graphical representation widget (e.g., edit box text, graphical primitive (GP) line, GP rectangle, label, push button, toggle button), a text string widget (edit box text, label, push button, toggle button), an interactive widget (e.g., edit box text, push button, toggle button), a map management widget (e.g., map grid, horizontal map, horizontal map source, horizontal map item list), a dynamic motion widget (e.g., GP line, GP rectangle, label), a utility widget (e.g., connector, cursor reference), and a UA validation widget (e.g., basic container, edit box text, horizontal map, horizontal map source, mutually exclusive container, push button, radio box, toggle button).

A layer could include a single widget or a grouping of widgets (or a list of widgets). Referring to FIG. 1A, layer 01 of DF 150-1 includes a grouping of widgets identified as 0001 through 0005; this layer has been designated as a super layer. Layer 02 of DF 150-2, layer 04 of DF 150-4, and layer 06 of DF 150-5 include single widgets 00A0, 0000, and 00E0, respectively. Layer 03 of DF 150-3 includes a grouping of widgets identified as 00B0 and 00B1, and layer 05 of DF 150-4 includes a grouping of widgets identified as 00D0 and 00D1.

A grouping or list of widgets could be drawn in an area of a window defined by a display surface format, where such format may be used for depicting images known to those skilled in the art. Display surface formats could be created from a single layer, and other display surface formats could be created from a plurality of different layers occupying the same area of a window, where each layer could be associated with, but not limited to, one or more of the following systems: an FMS, a TCAS, an ADS-B, a forward-looking radar system, a TAWS, a weather awareness and warning system, and an airspace awareness and warning system.

Each DF 150 could include a single layer or a grouping of layers. Each DF 150 may specify the definition of widget hierarchical structures and creation of widgets that describe UA interface pages. Referring to FIG. 1A, DFs 150-1, 150-2, 150-3, and 150-5 include single layers 01, 02, 03, and 06, respectively. DF 150-4 includes a grouping of layers 04 and 05. As discussed above, each DF 150 and each layer included therein could be owned by one UA. Referring to FIG. 1A, DF 150-1 is owned by WMUA 160, and DFs 150-2 through 150-5 are owned by UAs 0002 through 0005, respectively.

The WMUA 160 is representative of one or more UAs that could be owned by the CDS 130. Similar to the UAs of each remote aircraft system 120, the WG 170 may send notices of real-time event occurrences to the WMUA 160 and layer property changes such as changes to layer activation of layer 01. Responding to such notices, the WMUA 160 may update the runtime parameters of one or more widgets and send to the WG 170 requests for changes to one or more layer properties such as the layer visibility and activity of layer 01. As embodied herein, the contents of the DFs 150 may be read by the WG 170.

The WG 170 may include any electronic data processing unit which executes software or source code stored, permanently or temporarily, in a digital memory storage device as discussed above. The WG 170 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also include more than one electronic data processing units. As embodied herein, the WG 170 could be a processor(s) used by or in conjunction with any other system of the aircraft.

The WG 170 may be programmed or configured to receive as input data representative of information obtained from the pilot input device 110, the remote aircraft systems 120, and the components of the CDS 130. As discussed herein, the terms "programmed" and "configured" are synonymous with respect to the execution of software or source code developed for the specific functions and methods embodied herein. The WG 170 may be electronically coupled to systems and/or sources to facilitate the receipt of input data; as embodied herein, operatively coupled may be considered as interchangeable with electronically coupled. The WG 170 may be programmed to execute the methods embodied herein and discussed in detail below. The WG 170 may be programmed to provide output data to the remote aircraft systems 120, the components of the CDS 130, and the display unit 180. The WG 170 may be electronically coupled to systems and/or units to facilitate the providing of output data representative of a procedure. It is not necessary that a direct connection be made; instead, such receipt of input data and the providing of output data could be provided through a data bus or through a wireless network.

The display unit 180 may include any unit having a display surface on which widgets may be presented to the pilot on a display surface of the display unit 180. The display unit 180 could be, but is not limited to, a Primary Flight Director (PFD), Navigation Display (ND), Head-Down Display (HDD) Unit, Head-Up Display (HUD) Unit, Multi-Purpose Control Display Unit, EICAS, Electronic Centralized Aircraft Monitor, Multi-Function Display, Side Displays, and Data Link Control Display Unit.

Known to those skilled in the art, the HDD unit may present flight information to the pilot or flight crew—information relevant to the instant or immediate control of the aircraft, whether the aircraft is in flight or on the ground. The HDD unit is typically a unit mounted to an aircraft's flight instrument panel located in front of a pilot and below the windshield and the pilot's field of vision. The HDD unit displays the same information found on a PFD, such as "basic T" information (i.e., airspeed, attitude, altitude, and heading). Although it provides the same information as that of a PFD, the HDD unit may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, Mach number, radio altitude and decision height, final approach trajectory deviations, and marker indications.

The HUD unit provides flight information to the pilot or flight crew in the pilot's forward field of view through the windshield, eliminating transitions between head-down to head-up flying. Similar to the HDD unit, the HUD unit may be tailored to the desired configuration specified by a buyer or user of the aircraft. As embodied herein, the display unit 180 may receive image data provided by the WG 170.

The WG 170 may be programmed to own and manage one or more windows displayed on the surface of a display unit, where each window may be defined as a physical demarcation of space on the surface of the display unit 180. Such physical demarcation information may have been provided in the system CF 140 and read by the WG 170. The visibility of each window could be managed by the WG 170, wherein each window the appearance of widgets may be based upon both layer properties and widget parameters.

Figure 1B:
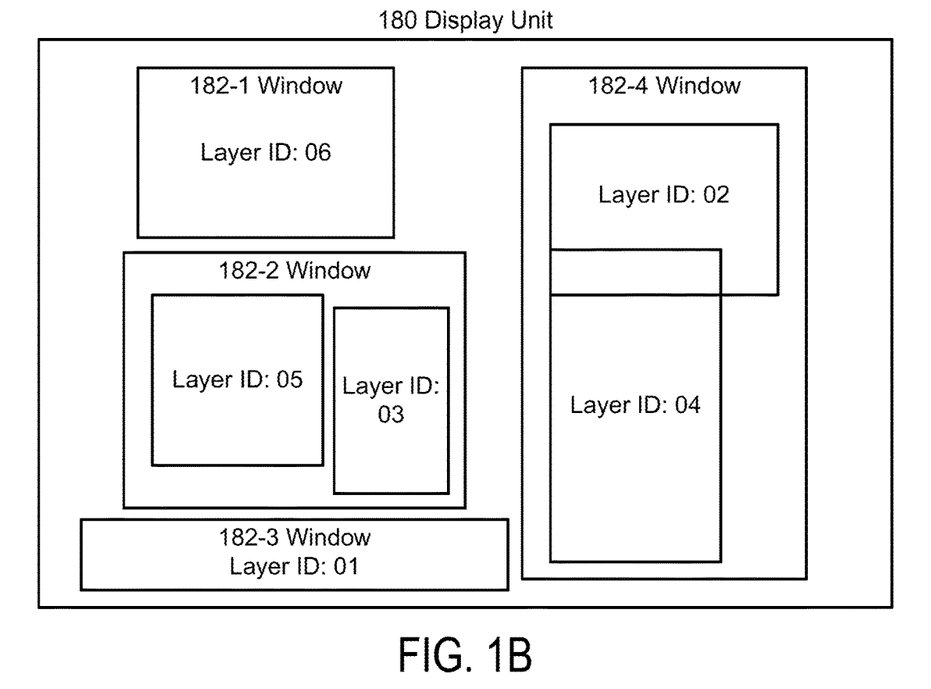
FIG. 1B depicts a plurality of layers and a plurality of windows.

Referring to FIGS. 1B and 1C, a plurality of windows 182 and layers are depicted for the purpose of illustration only. As shown in FIG. 1B, the WG 170 has defined a plurality of windows 182 and assigned one or more layers to areas in each window 182 based upon a display surface format. Layer 06 has been assigned an area in window 182-1, layers 03 and 05 have been assigned areas in window 182-2 and configured as non-overlapping, layer 01 has been assigned to window 182-3, and layers 02 and 04 have been assigned areas in window 182-4 and configured as overlapping.

Figure 1C:
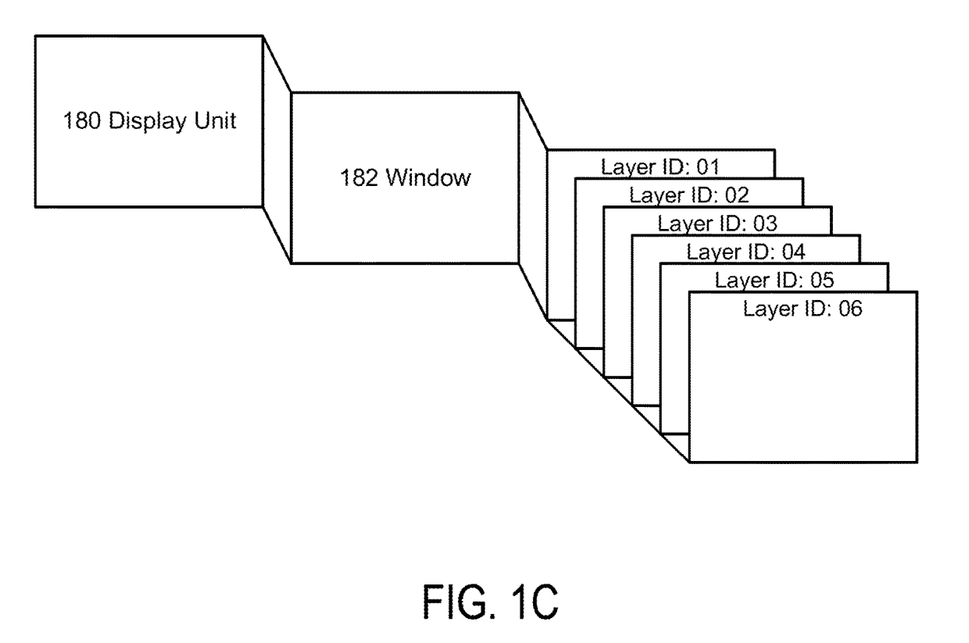
FIG. 1C depicts a plurality of overlapping layers assigned to one window.

Referring to FIG. 1C, the WG 170 has defined one window 182 and assigned a plurality of layers to overlapping the window 182 based upon a display surface format. Layers 01 through 06 have been assigned the area of window 182, where layers 02 through 06 overlap one or more of the other layers.

Figure 2:
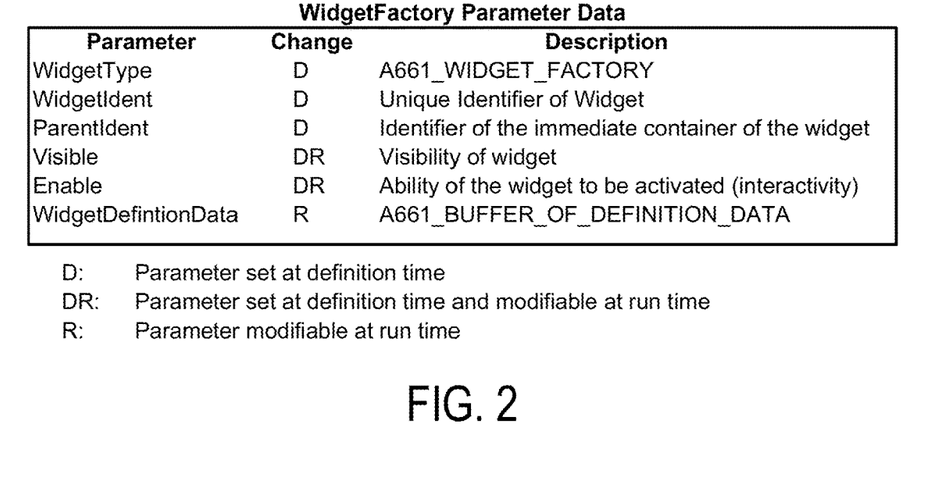
FIG. 2 depicts a table containing a list of widget parameters of a WidgetFactory widget.

The advantages and benefits of the embodiments disclosed herein may be illustrated by showing how ARINC 661 techniques may be exploited to define a WidgetFactory widget to facilitate the creation of widgets beyond a definition phase of ARINC 661. Referring to FIG. 2, a table of WidgetFactory widget parameters is shown. With the exception of the WidgetDefinitionData parameter, the other widget parameters shown in the table are common widget parameters known to those skilled in the art.

Figure 3:
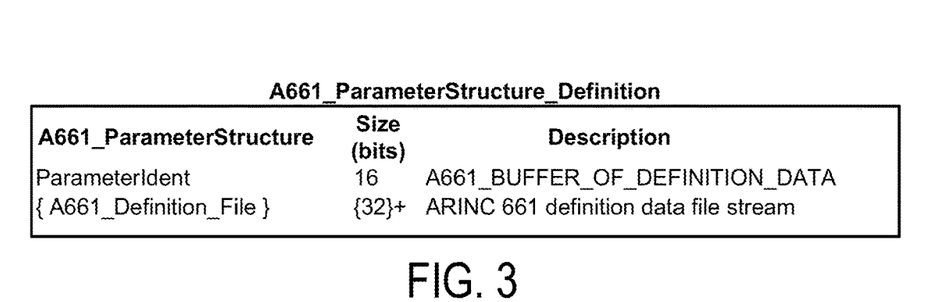
FIG. 3 depicts a table containing a parameter structure for a buffer employable by the WidgetFactory widget.

As shown in the table, the WidgetDefinitionData parameter is described as A661_BUFFER_OF_DEFINTION_DATA. Referring to FIG. 3, an exemplary structure of A661_BUFFER_OF_DEFINTION_DATA is illustrated. As observed, there is an A661_ParameterStructure identified as {A661_Definion_file}, which defines the structure of a DF. The structure of a DF has been defined by ARINC 661 and is known to those skilled in the art. DFs are preloaded in the CDS 130 prior to definition phase. Once the definition phase commences, the WG 170 loads the DFs and creates the widgets stated in the DF. Upon the completion of the definition phase, the run time phase commences in which the WG 170 may begin to activate layers and provide notification to the user applications of the activation. In response, the widget parameters of these layers may be sent. As the WG 170 loads the WidgetFactory widget parameters, the WidgetDefinitionData parameter is loaded; as such, the instructions of the {A661_Definion_file} WidgetDefinitionData parameter are loaded. Then, the WG 170 may be programmed to read the instructions of the WidgetDefinitionData parameter in the same or equivalent manner as DFs are read during the definition phase and respond as it would respond during the definition phase. If the content of the WidgetDefinitionData parameter includes instructions to create one or more widgets and/or one or more sub-layers, then one or more widgets and/or one or more sub-layers may be created.

Figure 4:
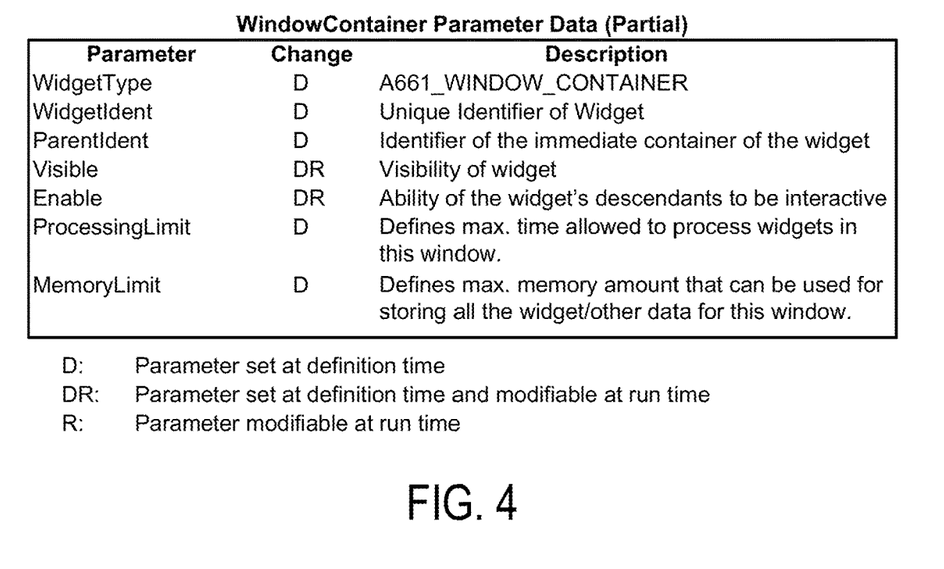
FIG. 4 depicts a table containing a list of widget parameters of a WindowContainer widget employable with the WidgetFactory widget.

Referring to FIG. 4, a table containing a partial list of WindowContainer widget parameters published in ARINC 661 is shown. As shown, the WindowContainer widget parameters include a ProcessingLimit parameter and a MemoryLimit parameter. These parameters may be employed to define a maximum widget processing time and a maximum amount of widget memory, respectively, for the WidgetFactory widget and/or any children of the widget. As will be disclosed below, the WindowContainer widget may be employed with a connector widget to inform the UA of run-time processing constraints. Through the use of this combination of widgets, constraints may be placed upon widget processing time and an allocation of widget memory. This could ensure that a static allocation of resources in a safety critical system prevents unwanted parties from exceeding processor and/or memory constraints by sending an overly-large amount of data via ARINC 661 communication protocols. If this combination of widgets is not used, default maximum values could be set by a manufacturer and/or end-user.

Figure 5:
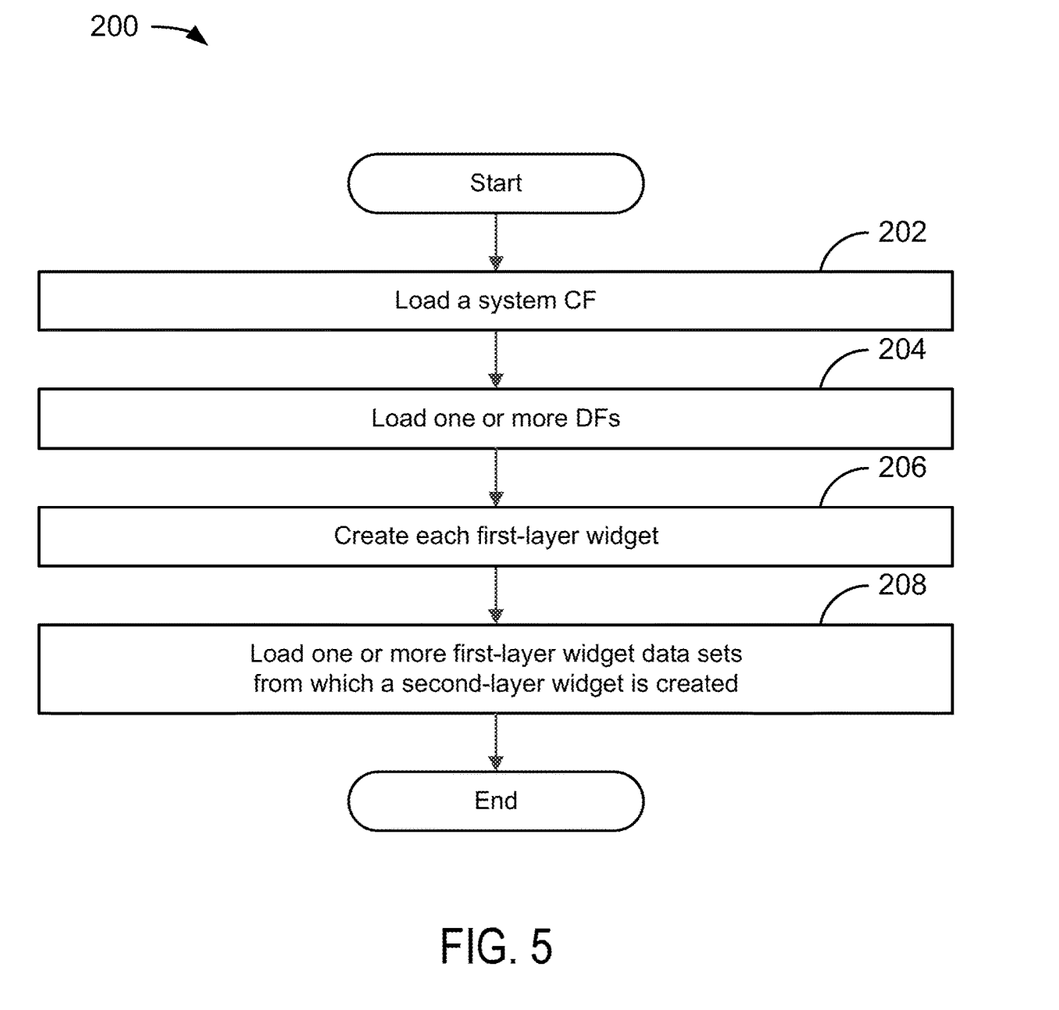
FIG. 5 depicts a flowchart providing an example for creating widgets during a run time phase.

FIG. 5 depicts flowchart 200 providing an example for creating widgets presentable to a viewer, where the WG 170 may be programmed or configured with instructions corresponding to the following modules. The WG 170 may be a processor unit of a module such as, but not limited to, a printed circuit card assembly having one or more input interfaces (e.g., virtual or physical computer ports) to facilitate data communications with the WG 170, i.e., the receiving and providing of data (e.g., one or more electrical or optical signals including data and/or being indicative of data). For the accomplishment of the following modules embodied in FIG. 5, the loading of data is synonymous and/or interchangeable with receiving of data and/or the retrieval of data.

The method of flowchart 200 begins with module 202 with the WG 170 loading of a system CF 140. The CF 140 could include the identification of one or more layers. The CF 140 could also include the display configuration format which configures the display surface of the display unit 180 with one or more windows. The layers may be assigned to the same area of one window. In addition, the system CF 140 could include some of the parameters of the WidgetFactory widget, where such parameters could include a WidgetDefinitionData parameter with the parameter structure of A661_BUFFER_OF_DEFINITION_DATA.

Figure 6:
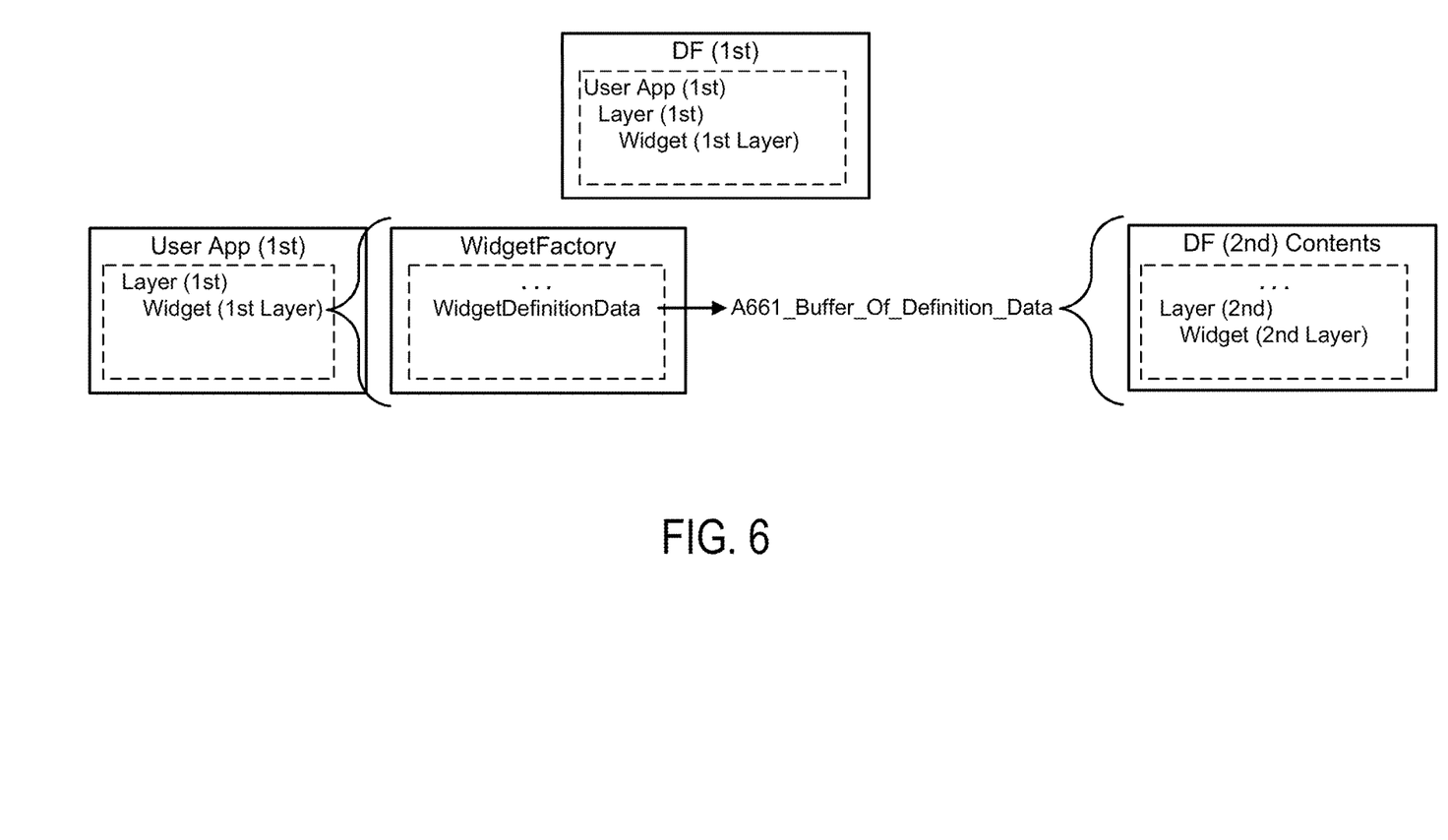
FIG. 6 depicts a functional block diagram employing a WidgetFactory widget.

The method of flowchart 200 continues with module 204 with the WG 170 loading of at least one first DF that may be owned by a first UA and include a first layer. As illustrated in FIG. 6, the first layer may include at least one first-layer widget defined by a set of first-layer widget parameters (e.g., a WidgetFactory widget parameters), wherein one parameter of the set (e.g., WidgetDefinitionData structured by the A661_BUFFER_OF_DEFINITION_DATA) could include contents corresponding to a second DF that includes one or more second-layer widgets. An example of this structure is shown in FIG. 6.

Figure 7:
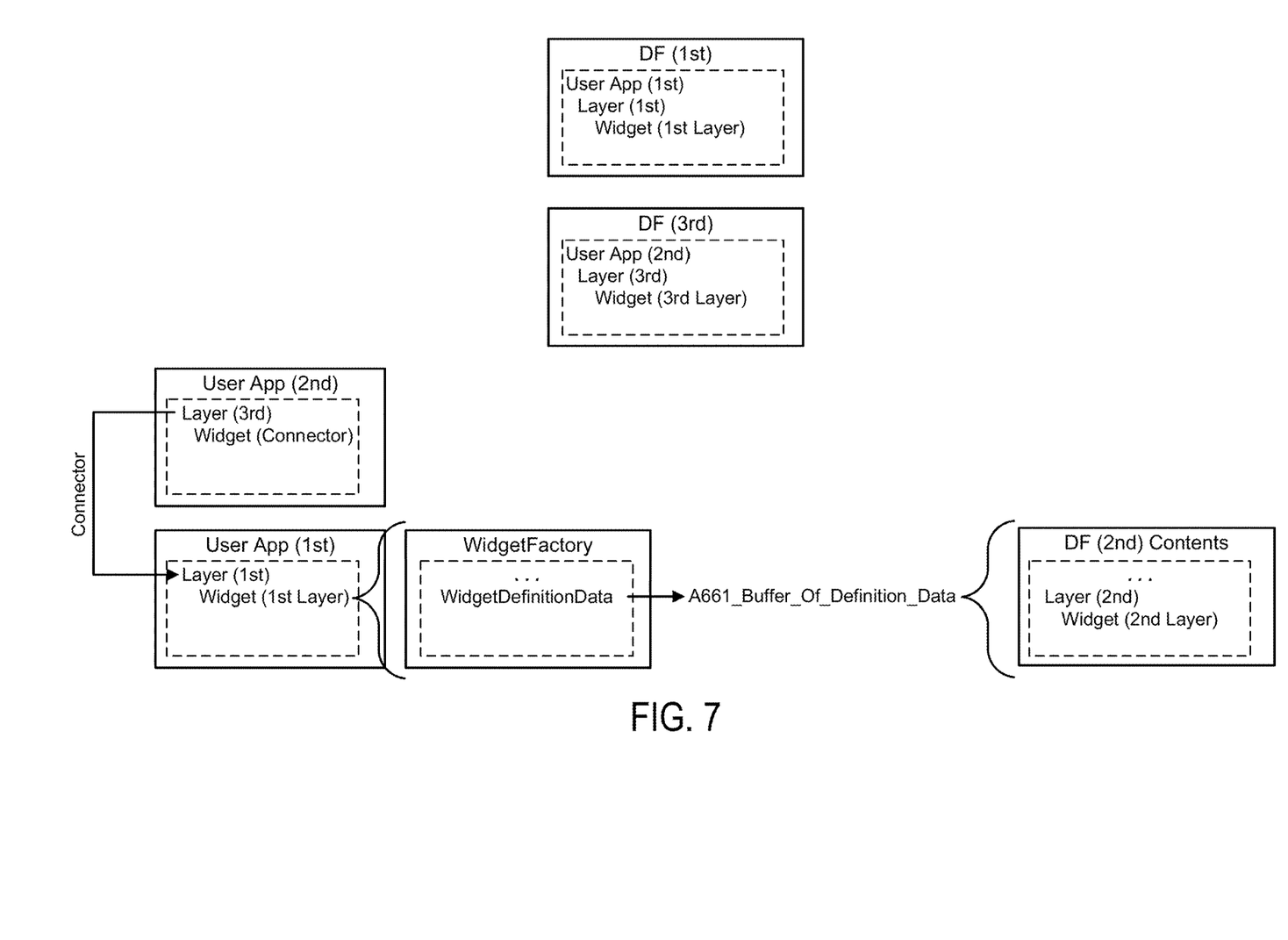
FIG. 7 depicts a functional block diagram in which a WidgetFactory widget is employed with a connector widget.

In some embodiments, at least one third DF may be loaded, where the third DF may be owned by a second UA and includes at least one third layer. As illustrated in FIG. 7, a third layer includes at least one third-layer widget such as a connector widget, where each connector widget may be defined by a set of connector widget parameters and connect the first and third layers together.

Figure 8:
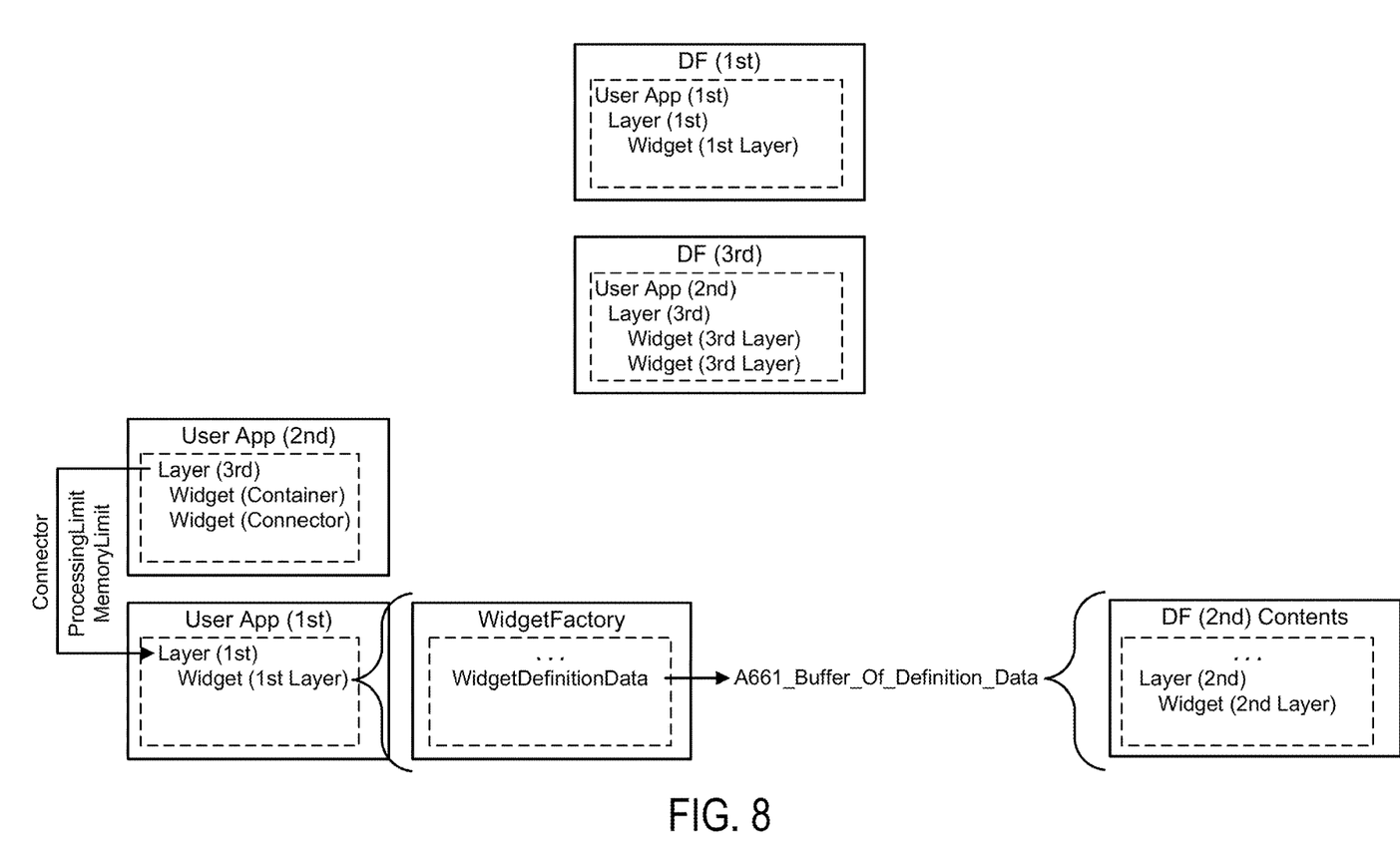
FIG. 8 depicts a functional block diagram in which a WidgetFactory widget is employed with a container widget.

As illustrated in FIG. 8, a third layer includes at least two third-layer widgets such as a container widget and a connector widget, where each connector widget may be defined by a set of connector widget parameters and connect the first and third layers together. In some embodiments in which a WindowContainer widget is employed as the container widget, the set of WindowContainer widget parameters could include ProcessingLimit and/or MemoryLimit parameters to define a maximum widget processing time and a maximum amount of widget memory, respectively, for the WindowContainer widget.

Returning to FIG. 5, the method of flowchart 200 continues with module 206 with the WG 170 creating each first-layer widget. In some embodiments, the functions of modules 202 through 206, inclusive, could form a first operation, where the first operation could be performed during the definition phase of ARINC 661.

The method of flowchart 200 continues with module 208 with the WG 170 loading of one or more sets of first-layer widget parameters. As a result, the contents corresponding to a second DF may be loaded and one or more second-layer widgets could be created in response to the contents corresponding to a second DF being loaded. In some embodiments, the functions of module 208 could form a second operation, where the second operation could be performed during the run time phase of ARINC 661. Then, the method of flowchart 200 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for creating widgets in an aircraft cockpit display system operating in accordance with ARINC Specification 661 (ARINC 661), comprising:
   a cockpit display system comprised of:
      a system configuration file;
      a plurality of definition files, where
         each definition file of the plurality of definition files is a non-executable file that is owned by one user application of avionic equipment and identifies such owner user application and at least one layer, where
            each layer is defined by layer parameters including a layer visibility parameter controlled through requests made by the owner user application to the cockpit display system and a layer activity parameter controlled by a windows generator,
            each layer identifies at least one widget, and
            each widget includes a plurality of widget parameters including a widget type parameter and a widget visibility parameter; and
      the windows generator, including at least one processor of the cockpit display system, configured to execute software or source code that:
         performs, during the definition phase as defined in ARINC 661, a first operation comprised of:
            loading the system configuration file,
            loading at least one first definition file of the plurality of definition files, and
            creating at least one widget for each first definition file, where
               visibility of each created widget is dependent upon its widget visibility parameter and the layer visibility and layer activity parameters of the layer identifying the created widget; and
         performs, at the commencement of the run-time phase as defined in ARINC 661, a second operation comprised of:
            loading at least one second definition file of the plurality of definition files referenced by a widget parameter identified in a first definition file, whereby
               at least one widget identified by one layer that is identified by one second definition file is created for each second definition file in response to each second definition file being loaded, where
                  visibility of each widget identified in each second definition file is dependent upon its widget visibility parameter and the layer visibility and layer activity parameters of the layer identifying such widget.

2. The system of claim 1, wherein
the owner user application is a first user application, and
the first operation is further comprised of:
   loading at least one third definition file of the plurality of definition files owned by a second user application, and
creating at least one widget for each third definition file.

3. The system of claim 2, wherein at least one widget for at least one third definition file is a container widget.

4. The system of claim 3, wherein the plurality of widget parameters for each container widget includes a maximum widget processing time parameter and a maximum amount of widget memory parameter.

5. The system of claim 2, wherein the cockpit display system is the owner of at least one of the first user application and the second user application.

6. The system of claim 2, further comprising:
an aircraft system other than the cockpit display system, where
   the aircraft system is the owner of the first user application and the second user application, or
   the aircraft system is the owner of the first user application and the cockpit display system is the owner of the second user application.

7. The system of claim 2, wherein the first user application and the second user application are the same user application.

8. A device for creating widgets in an aircraft cockpit display system operating in accordance with ARINC Specification 661 (ARINC 661), comprising:
   a windows generator, including at least one processor of a cockpit display system, configured to execute software or source code that:
      performs, during the definition phase as defined in ARINC 661, a first operation comprised of:
         loading a system configuration file,
         loading at least one first definition file of a plurality of definition files, where
            each definition file of the plurality of definition files is a non-executable file that is owned by one user application of avionic equipment and identifies such owner user application and at least one layer, where
               each layer is defined by layer parameters including a layer visibility parameter controlled through requests made by the owner user application to the cockpit display system and a layer activity parameter controlled by a windows generator, each layer identifies at least one widget, and each widget includes a plurality of widget parameters including a widget type parameter and a widget visibility parameter, and creating at least one widget for each first definition file, where visibility of each created widget is dependent upon its widget visibility parameter and the layer visibility and layer activity parameters of the layer identifying the created widget; and performs, at the commencement of the run-time phase as defined in ARINC 661, a second operation comprised of:

loading at least one second definition file of the plurality of definition files referenced by a widget parameter identified in a first definition file, whereby at least one widget identified by one layer that is identified by one second definition file is created for each second definition file in response to each second definition file being loaded, where visibility of each widget identified in each second definition file is dependent upon its widget visibility parameter and the layer visibility and layer activity parameters of the layer identifying such widget.

9. The device of claim 8, wherein the owner user application is a first user application, and the first operation is further comprised of:

loading at least one third definition file of the plurality of definition files owned by a second user application, and creating at least one widget for each third definition file.

10. The device of claim 9, wherein at least one widget for at least one third definition file is a container widget.

11. The device of claim 10, wherein the plurality of widget parameters for each container widget includes a maximum widget processing time parameter and a maximum amount of widget memory parameter.

12. The device of claim 9, wherein the cockpit display system is the owner of at least one of the first user application and the second user application.

13. The device of claim 9, wherein an aircraft system other than the cockpit display system is the owner of the first user application and the second user application, or the aircraft system is the owner of the first user application and the cockpit display system is the owner of the second user application.

14. The device of claim 9, wherein the first user application and the second user application are the same user application.

15. A method for creating widgets in an aircraft cockpit display system operating in accordance with ARINC Specification 661 (ARINC 661), comprising:

by performing, during the definition phase as defined in ARINC 661 by a windows generator of an cockpit display system employing the interface protocols of ARINC 661 including at least one processor configured to execute software or source code, a first operation comprised of:

loading a system configuration file;

loading at least one first definition file of a plurality of definition files, where each definition file of the plurality of definition files is a non-executable file that is owned by one user application of avionic equipment and identifies such owner user application and at least one layer, where each layer is defined by layer parameters including a layer visibility parameter controlled through requests made by the owner user application to the cockpit display system and a layer activity parameter controlled by a windows generator, each layer identifies at least one widget, and each widget includes a plurality of widget parameters including a widget type parameter and a widget visibility parameter, and creating at least one widget for each first definition file, where visibility of each created widget is dependent upon its widget visibility parameter and the layer visibility and layer activity parameters of the layer identifying the created widget; and performing, at the commencement of the run-time phase as defined in ARINC 661, a second operation comprised of:

loading at least one second definition file of the plurality of definition files referenced by a widget parameter identified in a first definition file, whereby at least one widget identified by one layer that is identified by one second definition file is created for each second definition file in response each second definition file being loaded, where visibility of each widget identified in each second definition file is dependent upon its widget visibility parameter and the layer visibility and layer activity parameters of the layer identifying such widget.

16. The method of claim 15, wherein the owner user application is a first user application, and the first operation is further comprised of:

loading at least one third definition file of the plurality of definition files owned by a second user application, and creating at least one widget for each third definition file.

17. The method of claim 16, wherein at least one widget for at least one third definition file is a container widget.

18. The method of claim 17, wherein the plurality of widget parameters for each container widget includes a maximum widget processing time parameter and a maximum amount of widget memory parameter.

19. The method of claim 16, wherein the cockpit display system is the owner of at least one of the first user application and the second user application.

20. The method of claim 16, wherein an aircraft system other than the cockpit display system is the owner of the first user application and the second user application, or the aircraft system is the owner of the first user application and the cockpit display system is the owner of the second user application.

* * * * *